United States Patent [19]

Inoue et al.

[11] Patent Number: 4,575,603
[45] Date of Patent: Mar. 11, 1986

[54] TW-ELECTROEROSION WITH CONTROLLED FLUSHING FLOW GUIDANCE MEANS

[75] Inventors: Kiyoshi Inoue, Tokyo; Makoto Onoue, Kanagawa; Sadao Sano, Kanagawa; Jun Hayakawa, Kanagawa, all of Japan

[73] Assignee: Inoue-Japax Research Incorporated, Kanagawaken, Japan

[21] Appl. No.: 587,923

[22] Filed: Mar. 9, 1984

[30] Foreign Application Priority Data

| Mar. 12, 1983 | [JP] | Japan | 58-40949 |
| Mar. 12, 1983 | [JP] | Japan | 58-40950 |
| Mar. 12, 1983 | [JP] | Japan | 58-40951 |
| Apr. 21, 1983 | [JP] | Japan | 58-70506 |
| Apr. 21, 1983 | [JP] | Japan | 58-70507 |
| Apr. 26, 1983 | [JP] | Japan | 58-63452[U] |

[51] Int. Cl.$^4$ ............... B23H 7/36; B23H 7/02
[52] U.S. Cl. ............... 219/69 D; 204/129.6; 204/206; 219/69 W
[58] Field of Search ............ 219/69 D, 69 W, 69 M, 219/69 E, 69 R; 204/129.25, 129.5, 129.6, 206

[56] References Cited

U.S. PATENT DOCUMENTS

| 4,263,493 | 4/1981  | Kilcher | 219/69 W |
| 4,414,456 | 11/1983 | Inoue   | 219/69 W |
| 4,459,454 | 7/1984  | Inoue   | 219/69 D |
| 4,473,733 | 9/1984  | Inoue   | 219/69 M |
| 4,481,095 | 11/1984 | Inoue   | 219/69 W |
| 4,484,052 | 11/1984 | Inoue   | 219/69 M |
| 4,507,532 | 3/1985  | Inoue   | 219/69 W |

FOREIGN PATENT DOCUMENTS

| 2809506 | 9/1979 | Fed. Rep. of Germany ... 219/69 W |
| 57-96734 | 6/1982 | Japan ............................. 219/69 M |
| 2102323 | 6/1982 | United Kingdom . |
| 921743  | 4/1982 | U.S.S.R. ......................... 219/69 W |

Primary Examiner—C. L. Albritton
Assistant Examiner—Geoffrey S. Evans
Attorney, Agent, or Firm—Karl F. Ross; Herbert Dubno

[57] ABSTRACT

A traveling-wire electroerosion apparatus using a first nozzle disposed at one side of a workpiece so as to coaxially surround the electrode wire moving into the workpiece for directing under a relatively low pressure a cutting liquid medium into a cutting zone in the workpiece and a second nozzle disposed at the other side of the workpiece so as to coaxially surround the electrode wire moving from the workpiece for directing under a relatively high pressure the cutting liquid medium into the cutting zone. A liquid flow guidance member, generally in the form of an annular disk or discus, is disposed at that one side of the workpiece and adjacent thereto so as to overlie at least a region of the cutting slot generated behind the advancing electrode wire, which region is adjacent the nozzle opening of the first nozzle. The flow guidance member has a liquid escape passage formed therein adjacent the said nozzle opening and a flow deflecting surface overlying the said region for impeding direct flow of the flushing liquid medium from the cutting slot and creating a high-velocity stream of the high-pressure cutting liquid medium from the second nozzle flowing through and out of that liquid escape passage.

30 Claims, 34 Drawing Figures

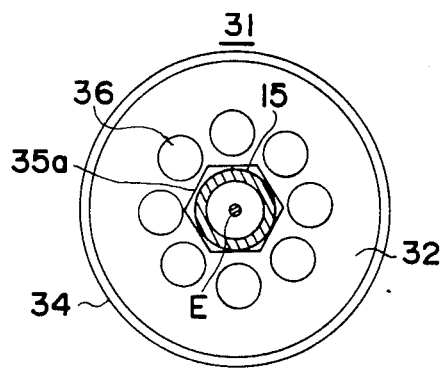
FIG. 2
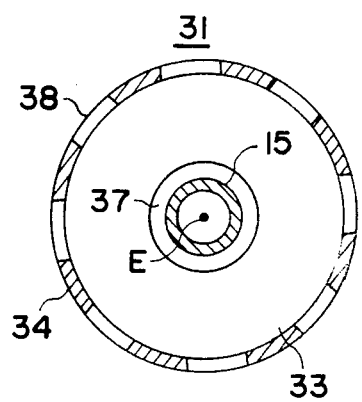
FIG. 3
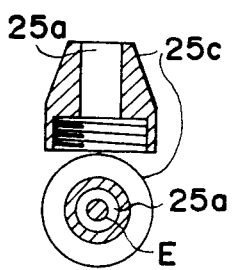
FIG. 4A
FIG. 4B
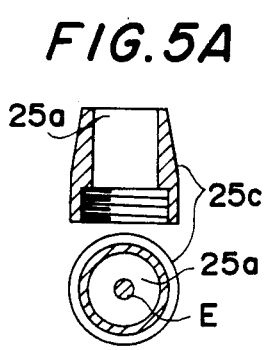
FIG. 5A
FIG. 5B
FIG. 6A
FIG. 6B
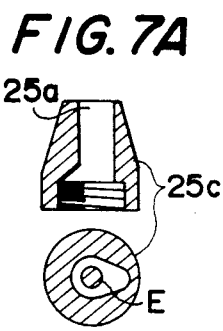
FIG. 7A
FIG. 7B
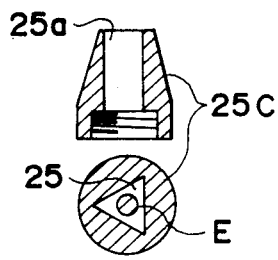
FIG. 8A
FIG. 8B

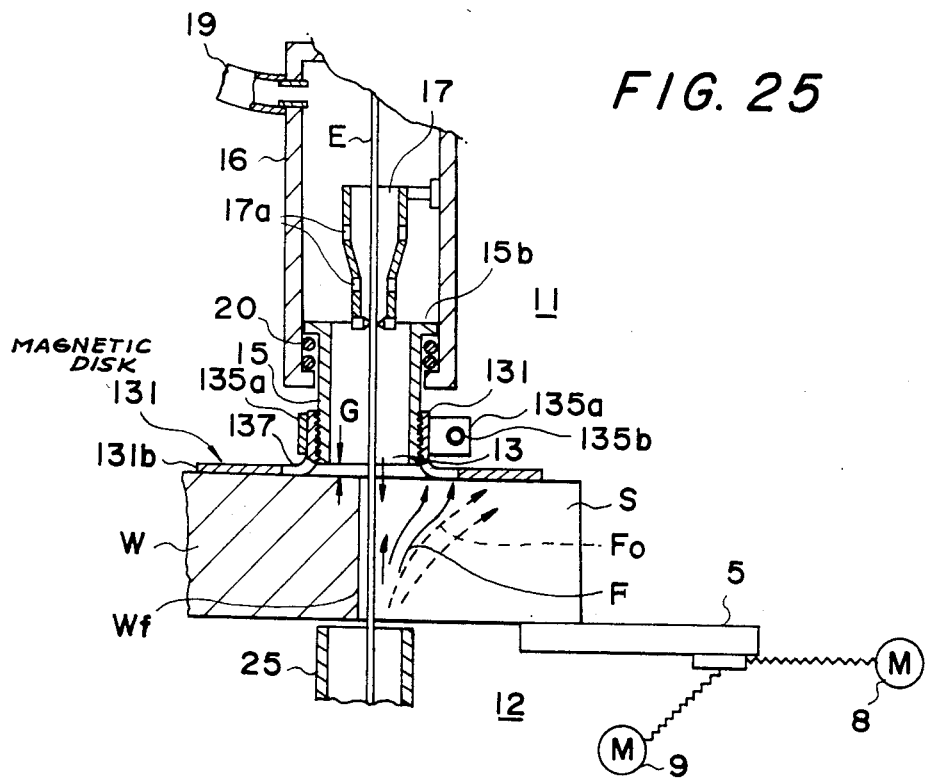
FIG. 25
FIG. 26
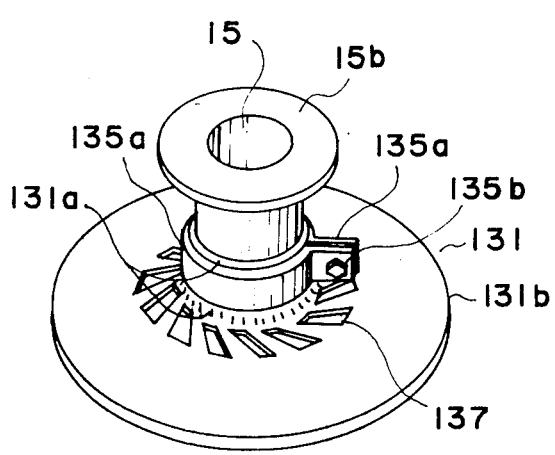
FIG. 27

TW-ELECTROEROSION WITH CONTROLLED FLUSHING FLOW GUIDANCE MEANS

FIELD OF THE INVENTION

The present invention relates generally to traveling-wire (TW) electroerosion and, more particularly, to a new and improved apparatus for electroerosively cutting an electrically conductive workpiece with an axially traveling continuous wire electrode, the apparatus including means whereby a highly favorable, intensified, dynamic flushing flow of cutting liquid medium is created across a cutting zone in the workpiece to allow a cutting operation to proceed at a highly enhanced rate with due cutting precision.

BACKGROUND OF THE INVENTION

The process of TW-electroerosion generally makes use of a continuous wire electrode composed of, say, brass or copper, or brass- or copper- coated steel, and having a thickness or diameter ranging between 0.05 and 0.5 mm. The term "wire electrode" or "electrode wire" has been used in the art and hence is used throughout herein, to refer to a thin, continuous elongate electrode element generally and to include not only a conductive wire which may be circular, triangular, square, rectangular or polygonal in cross section but a like continuous element in the form of a conductive tape or ribbon. The electrode wire is axially transported continuously from a wire supply to a wire takeup through a cutting region in which a workpiece is disposed. The cutting region is commonly defined between a pair of guide members which support and hold the wire while traveling through the workpiece. Wire traction and braking means allow the continuous wire to be tightly stretched and kept taut under a given tension and to be axially driven between the cutting guide members while traversing the workpiece, thus presenting a continuously renewed electrode surface juxtaposed in an electroerosive cutting relationship with the workpiece across a narrow gap or cutting zone. The cutting zone is flushed with a cutting liquid medium, e.g. water, and is electrically energized with a high-current-density electrical machining current which is passed between the electrode wire and the workpiece to erode the latter or erosively remove material therefrom.

The cutting process may be performed in any of various electroerosive machining modes. In electrical discharge machining (EDM), the cutting liquid is a dielectric liquid, e.g. deionized water, and the machining electric supplied in the form of a succession of electrical pulses. In electrochemical machining (ECM), the cutting medium is a liquid electrolyte, e.g. an aqueous electrolytic solution, and the machining current is a high-amperage continuous or pulsed current. In electrochemical-discharge machining (ECDM), the liquid medium has both electrolytic and dielectric nature and the machining current is preferably applied in the form of pulses which facilitate the production of electric discharges through the conductive liquid medium.

The workpiece may be disposed in a bath of the cutting liquid medium to immerse the cutting region therein. More typically, however, the cutting zone is disposed in the air or ambient environment. Advantageously, one or two nozzles of the conventional design disposed at one or both sides of the workpiece have been employed to deliver the cutting liquid medium to the cutting region disposed in the air or immersed in the liquid medium. The cutting liquid medium is conveniently water as mentioned, which is deionized or ionized to a varying extent to serve as a desired electroerosive cutting medium.

To advance electroerosive material removal in the workpiece, the latter is typically displaced relative to the traveling wire and transverse thereto. This allows the traveling wire to advance translationally in the workpiece and consequently a narrow cutting slot to be progressively formed behind the advancing wire, the slot having a width substantially greater than the thickness of the wire. The continuous relative displacement along a precision-programmed path results in the formation of a desired contour corresponding thereto and defined by this cutting slot in the workpiece.

Higher cutting speed in the process described is ever an increasing demand in the industry and should be achieved with due precision. The cutting speed, typically expressed in $mm^2$/min, is defined by the product of the workpiece thickness and the length of cut achieved per unit time along a given course and hence is, for a given workpiece thickness, dependent upon the rate to which translational advance of the wire electrode can be increased. The rate of advance is in turn limited by the rate of actual material removal dependent on the one hand upon the preset cutting parameters that govern, inter alia, the cutting accuracy and on the other hand upon the conditions in the cutting zone which may instantaneously vary. If the rate of advance happens to exceed the rate of actual material removal, the fine wire may break. The goal of higher cutting speed is, therefore, dependent on the extent to which optimum conditions in the cutting zone may be established and may be maintained stably in the face of instantaneous changes. Among other factors which govern these conditions, it has been recognized that adequate flushing is of particular importance.

In the interest of increasing the cutting speed in the TW-electroerosion process, it is thus necessary that the cutting zone be flushed with the cutting liquid in a sufficient volume and at a sufficiently high flow rate, yet uniformly along its entire length, i.e. across the thickness of the workpiece, to allow the erosive action to continue with stability, the cutting chips and other erosive products to be carried away promptly and the wire subject to erosive heating to be cooled with greater effectiveness. Accordingly, the art has seen various improvements in the structures of fluid-delivery nozzles and the manner of supplying the liquid medium in the cutting zone. It has been observed, however, that they are much less than ideal. Some of them have left much to be desired from practical standpoints and the others have been found only satisfactory to substantially increase the cutting speed where the workpiece is relatively thin. The greater the workpiece thickness, the more difficult it is to achieve the same cutting speed as may be attainable with thinner workpieces.

OBJECT OF THE INVENTION

Accordingly, the present invention seeks to provide an improved traveling-wire electroerosion cutting apparatus with novel and yet relatively simple means for optimizing the flushing condition in the cutting zone to allow a substantial increase in the cutting speed over the conventional system, practically irrespective of the thickness of the workpiece.

SUMMARY OF THE INVENTION

In accordance with the present invention there is provided an apparatus for electroerosively cutting an electrically conductive workpiece with a continuous wire electrode, having means for axially transporting the wire electrode through the workpiece while defining a cutting zone therewith flushed with a cutting liquid medium, power supply means for electrically energizing said cutting zone to erode the workpiece and cutting feed means for relatively displacing the workpiece and the traveling wire electrode transversely along a cutting path to progressively form a cutting slot behind the wire electrode advancing along the path in the workpiece, which apparatus comprises: first nozzle means disposed at one side of the workpiece and having a nozzle opening juxtaposed with the cutting zone and substantially coaxially surrounding the wire electrode for directing the cutting liquid medium under a first pressure into the cutting zone from the said one side; second nozzle means disposed at the other side of the workpiece and having a nozzle opening juxtaposed with the cutting zone and substantially coaxially surrounding the wire electrode for directing the cutting liquid medium under a second pressure higher than the first pressure into the cutting zone from the said other side; and liquid flow guidance means disposed at the said one side and adjacent to the workpiece and the nozzle opening of the said first nozzle means, the said flow guidance means having a liquid escape passage formed therein adjacent the said nozzle opening and a flow deflecting surface overlying the cutting slot along a length thereof for impeding the liquid medium in the cutting slot to flush out freely into the said one side along the said lenth and creating a high-velocity stream of the high-pressure cutting liquid medium from the said second nozzle means flowing into, through and out of the said liquid escape passage.

BRIEF DESCRIPTION OF THE DRAWING

The features and advantages of the present invention will become readily apparent from a reading of the following description of certain preferred embodiments thereof when taken with reference to the accompanying drawing in which:

FIG. 2 is a transverse cross-sectional and plan view of flow guidance means of FIG. 1 taken along the line II—II therein and seen in the direction of the arrows;

FIG. 3 is a transverse cross-sectional view of the flow guidance means of FIG. 1, taken along the line III—III therein and seen in the direction of arrows;

FIGS. 4A-8A are longitudinal sectional views diagrammatically illustrating various nozzle pieces which may be employed in the system of FIG. 1, FIGS. 4B-8B are respective diagrammatic transverse cross-sectional views of these nozzle pieces;

FIG. 25 is a diagrammatic elevational and partly sectional view of a essential portion of a flow guidance system which represents another embodiment of the present invention;

FIG. 26 is a perspective view of the system of FIG. 25;

FIG. 27 is a sectional view diagrammatically illustrating a portion of the system of FIGS. 25 and 26;

SPECIFIC DESCRIPTION

Figure 1:
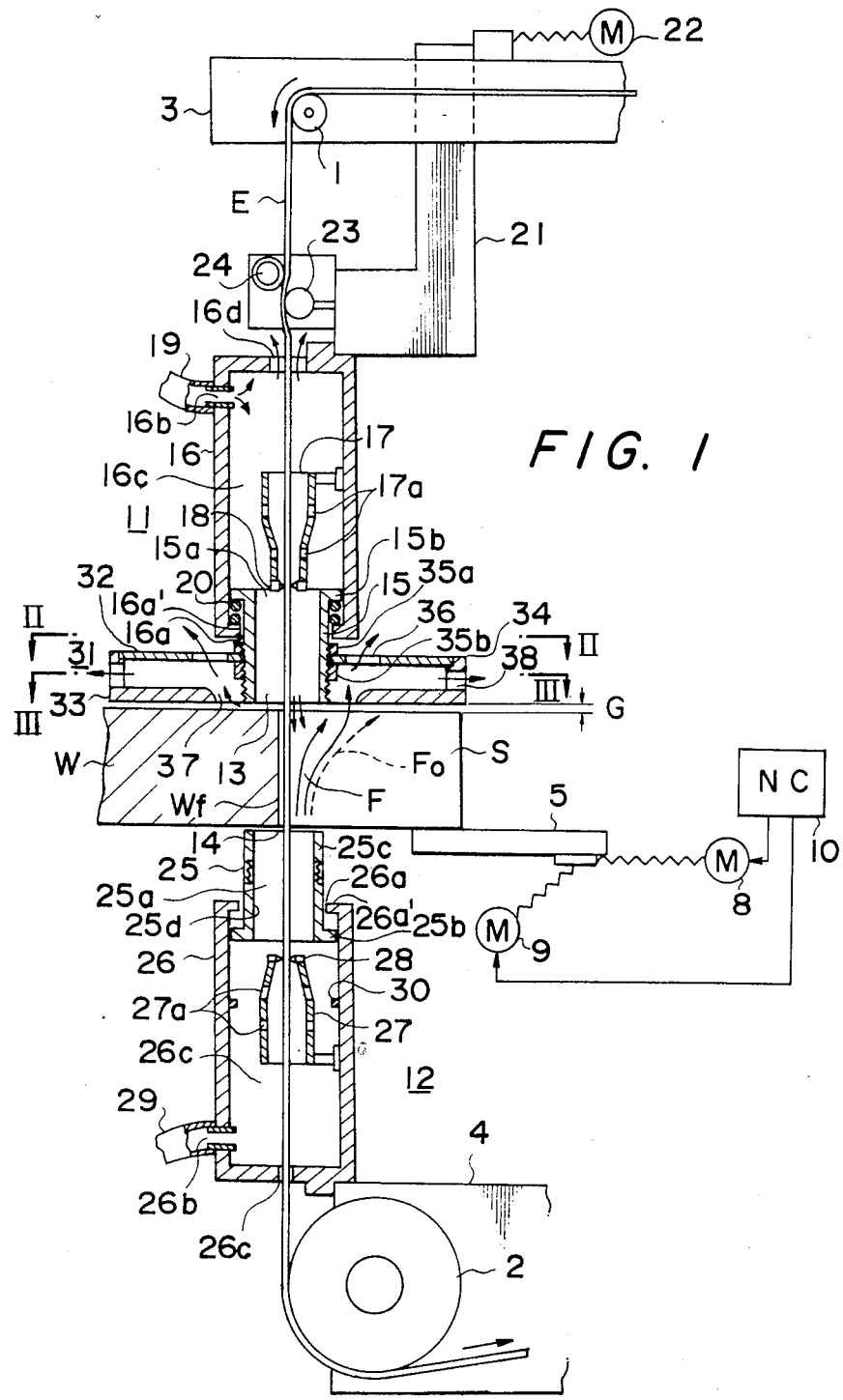
FIG. 1 is a diagrammatic elevational and partly sectional view illustrating a TW-EDM system incorporating the principles of the present invention.

Referring now to FIG. 1 there is shown a TW electroerosion, e.g. EDM, system for erosively cutting an electrically conductive workpiece W with a continuous electrode wire E which is continuously transported through the workpiece W, downwards in the illustrated arrangement, between rolls 1 and 2 mounted on upper and lower arms 3 and 4, respectively. The arms 3 and 4 extend parallel to each other, horizontally from a column (not shown) standing upright on a base (not shown) in the conventional electroerosion machine design. The workpiece W is securely mounted on a worktable 5 movably mounted typically on the machine base and which in a conventional cross-feed arrangement is driven by a pair of motors 8 and 9 designed to move the workpiece W along an X- and a Y-axis, respectively, in a horizontal or X-Y plane. The motors 8 and 9 are designed to be energized with drive signals furnished from an NC unit 10 based on a set of instructions to move the workpiece W relative to the electrode wire E along a programmed cutting path in the X-Y plane. The electrode wire E is continuously dispensed from a wire supply (not shown) typically mounted on the machine column and, passing over the upper roll 1, through the workpiece W and over the lower roll 2, is collected onto a conventional takeup arrangement (not shown) which may extend over the lower arm 4 and the machine column.

At opposite sides of the workpiece W between the rolls 1 and 2 there are disposed nozzle assemblies 11 and 12 having nozzle openings 13 and 14, respectively, for delivering a cutting liquid medium into a cutting zone defined with the traveling wire E in the workpiece W while cooling the wire E and the workpiece W. As will be described, the first nozzle assembly 11, shown as the upper one, is designed to deliver the cutting liquid medium under a relatively low pressure and the second nozzle assembly 12, shown as the lower one, is designed to deliver the cutting liquid medium under a relatively low but higher, pressure. Both openings 13 and 14, upper and lower, are shown as coaxial with the electrode wire E passing therethrough. The two nozzle assemblies 11 and 12 have similar structures and are arranged essentially coaxially with one another and thus have their axes coincident with a desired path of travel of the electrode wire E through the workpiece W.

The upper nozzle assembly 11 comprises a cylindrical nozzle member 15 and a housing member 16 constituting a supporting base and fluid-delivery receptacle therefor. The cylindrical member 15 has its outlet defining the nozzle opening 13 and is slidably received in the housing member 16, extending through a lower opening 16a formed therein. The housing member 16 is provided with a fluid inlet 16b communicating via a flexible hose 19 with a cutting liquid supply system not shown here and to be described. Securely mounted in a duct 6c defined by the housing member 16 is a downwardly convergent tubular body 17 which carries at its lower end an annular guide member 18 for slidably guiding the electrode wire E traveling into the workpiece W. The tubular wire-guide carrier body 7 is formed with apertures 17a so that the cutting liquid medium introduced through the inlet 16b may be partly diverted to flow in contact with the electrode wire E in the body 7 and to flow out through the apertures 17a into the outlet chamber 15a formed in the nozzle member 15. The nozzle member 15 is formed at its upper end with a circular flange or radial extension 15b slidably received in the housing member 16. The flange 15b is resiliently supported on a helical spring 20 which is in turn seated on an annular inner edge 16a' which defines the lower opening 16a, of the housing member 16. In this manner, the nozzle member 15 is retained in the housing member 16 against falling out due to gravity and also a fluid pressure acting on the flange 15b in the inlet duct 16c. The nozzle member 15, the housing member 16 and the wire-guiding tubular body 17 are constructed to be coaxial with one another.

Likewise, the lower nozzle assembly 12 comprises a cylindrical nozzle member 25 defining an outlet duct 25a and a housing member 26 defining an inlet duct 26c.

The cylindrical member 25 has its outlet defining the nozzle opening 14 and is slidably received in the housing member 26 through an upper opening 26a formed therein. The housing member 26 is provided with a fluid inlet 26b communicating via a flexible hose 29 with the cutting liquid supply system to be described. A tubular wire-guide carrier 27, here upwardly convergent, is securely mounted in the chamber 26c and carries an annular guide member 28 for slidably guiding the electrode wire E traveling from the workpiece W. The tubular wire-guide carrier 27 is, here again, formed with apertures 27a to enable a portion of the cutting liquid medium introduced through the inlet 26b to be diverted to flow in contact with the electrode wire E moving in the carrier 27 and to flow out into the outlet duct 25a through the apertures 27a. The nozzle member 25 is formed at its lower end with a circular flange or radial extention 25b slidably received in the housing member 26. The flange 25b, here again, cooperates with an annular inner edge 26a', which defines the upper opening 26a, of the housing member 26 so as to prevent its moving out of the latter. Furthermore, the housing member 26 has a ring 30 attached at a suitable height in the inner wall thereof to hold the nozzle member 25 against falling due to gravity below that height, and to allow the nozzle member 25 to be freely movable, or variably projectable, within a limit determined by the distance between the edge 26a' and the stopper ring 30, with respect to, or from, the housing member 26. The nozzle member 25, the housing member 26 and the wire-guiding tubular carrier 27 are here again constructed to be coaxial with one another, and with members, 15, 16 and 27, of the upper nozzle assembly 11.

The housing member 16 of the upper nozzle assembly 11 is securely mounted on a vertical carriage 21 which depends from the upper horizontal arm 3. The carriage 21 is vertically movable relative to the arm 3 by means of a motor 22 carried thereon to adjust the vertical position of the upper nozzle assembly 11. The carriage 21 is also arranged to carry a wire-energizing pin 23 to locate it immediately above the housing member 16 and a guide roll 24 adjacent the conducting pin 23 to hold in steady electrical contact therewith the electrode wire E traveling from the upper roll 1 into the upper nozzle assembly 11. The housing member 16 has an upper opening 16d coaxially surrounding the wire E and the opening 16d is of a width sufficient to allow a portion of the introduced cutting liquid medium in the chamber 16c to flow out therethrough to cool the conducting pin 23 and the electrically energized wire E prior to entry into the upper nozzle assembly 11. The conducting pin 23 is electrically connected to one terminal of an electroerosion power supply (not shown) while the workpiece W is electrically connected to the other terminal thereof to pass an erosion current between the workpiece W and the traveling wire E in the cutting zone. That one terminal of the power supply may also be electrically connected to the lower guide roll 2 to apply the erosion current to the traveling wire E through a portion thereof leaving the lower nozzle assembly 12 through a lower opening 26d formed in the housing member 26. Thus, a substantial traveling length of the wire which is electrically energized is held thoroughly in contact with the cutting liquid medium as coolant while moving from the conducting pin 23 through the upper nozzle assembly 11, the workpiece W and the lower nozzle assembly 12.

When the duct 16c in the housing member 16, fixed in position, of the upper nozzle assembly 11 is supplied with the pressurized cutting liquid medium from the fluid supply system, the "floating" nozzle member 15 is moved down with the fluid pressure acting on the flange portion 15b and is projected from the housing member 16 while directing the cutting liquid medium to flow coaxially with the electrode wire E through the duct 15a therein and then to flow out of the outlet opening 13 partly downwards into the workpiece W and partly laterally radially through the annular interstice defined with the upper surface of the workpiece W. Likewise, the nozzle member 25 in the lower nozzle assembly 12 is "floated". When the duct 26c in the housing member 26 is supplied with the pressurized cutting liquid medium from the supply system, the nozzle member 25 supported on the stop ring 30 is moved up with the fluid pressure acting on the flange portion 25b and projects from the housing member 26 while guiding the cutting liquid medium to blow coaxially with the electrode wire E through the duct 25a therein and then to flow out of the outlet opening 14 partly upwards into the workpiece and partly laterally radially through the annular interstice defined with the lower surface of the workpiece W.

The workpiece W has a cutting slot S electroerosively formed therein behind the electrode wire E as the wire is effectively moved translationally, here from right to left, in and relative to the workpiece W in the course of cutting feed displacement of the latter by means of the motors 8 and 9 and the feed controller 10. Electroerosion current is passed between the electrode wire E traveling through the workpiece W and a portion of the workpiece adjacent thereto across a narrow erosion gap flushed with the cutting liquid medium. A cutting front, thus progressively formed in the workpiece W, has a semi-cylindrical surface equally spaced from the electrode wire E with the erosion gap spacing and is designated by reference Wf. The cutting front Wf and hence the cutting slot S have a narrow width, equal to the diameter of the electrode wire E plus twice the erosion gap spacing and thus slightly greater than the thickness of the electrode wire E. Since the cutting slot is contiguous with the cutting front Wf, the cutting liquid medium injected into the cutting zone from the two nozzle assemblies 11 and 12 disposed at the opposite sides of the workpiece W tends to flow out through the cutting slot S. It is desirable to increase the pressure of the cutting liquid medium injected into the cutting zone to intensify the flow thereof adjacent the electrode wire E against this tendency. While higher pressure is thus generally desirable to substantially increase the cutting speed, it has now been found that the use of a higher pressure alone results in only a limited increase in the cutting speed and is unsatisfactory when a further higher target of the cutting speed is sought.

It has now been found that this target of higher cutting speed is achieved when one of the two nozzle assemblies is designed to discharge the cutting liquid medium under a first elevated pressure into the cutting zone, and the other nozzle assembly is designed to discharge the cutting liquid medium under a second elevated pressure, which is higher than the first pressure, into the cutting zone, and further when fluid flow guide means to be described is provided at one side of the workpiece, which side is the side at which that one nozzle assembly is disposed.

In the illustrated arrangement, the upper nozzle assembly 11 is designed to discharge the cutting liquid medium into the cutting zone under the first pressure ranging between 1 and 10 kg/cm$^2$. The lower nozzle assembly 12 is designed to discharge the cutting liquid medium into the cutting zone under the second pressure ranging between 5 and 20 kg/cm$^2$. As mentioned previously, in the upper nozzle assembly 11, the pressure of the liquid in the inlet duct 16c acts on the flange 15b to urge the nozzle member 15 downwards and towards the workpiece W. The nozzle member 15 thus projects from the housing member 16 and tends to come into contact with the workpiece W. In the lower nozzle assembly 12, the pressure of the liquid in the inlet duct 26c acts on the flange 25b to urge the nozzle member 26 upwards and towards the workpiece W. The cutting liquid medium from the upper and lower nozzle assemblies 11 and 12 is forced into the narrow cutting zone and slot S. As a result, a high pressure is created between the nozzle outlets 13 and 14, tending to move back both the nozzle members 15 and 25. Thus, the nozzle members 15 and 25 projecting from the base housing members 16 and 26 come to and are maintained in their respective force-balancing positions close to the workpiece W with small spacings through which portions of the cutting liquid medium from nozzle outlets 13 and 14 radially flow out.

The liquid flow guide means in the illustrated embodiment is constituted by a hollow discus-shaped member 31 securely arranged on an end portion of the nozzle member 15 coaxially therewith. The hollow discus-shaped member 31 (hereinafter discus member) here comprises two bored circular disk plates 32 and 33 and an annular side element 34 fastening these disk plates along their peripheries. The upper disk plate 32 has a central bore accepting the cylindrical nozzle member 15 therethrough and is secured by means of a pair of nuts 35a and 35b to the threaded nozzle member 15 to detachably fasten the discus member 31 thereto. The disk plate 32 has a plurality of openings 36 which may, as shown in FIG. 2, be each circular and are arranged equi-distantly around the cylindrical nozzle member 15. The lower disk plate 33 has a central bore 33a of a diameter sufficient to form an annular space 37 of a suitable width about the end portion of the nozzle member 15. The side element 34 is also formed with a plurality of openings 38. The discus member 31 is positioned on the nozzle 15 to locate the flat lower surface of the lower disk plate 33 flush or substantially flush with the end thereof and closely adjacent to the upper surface of the workpiece W with a uniform spacing G.

In the absence of liquid guide means 31 as shown and described, two liquid streams coaxially surrounding the electrode wire E may be injected into the cutting zone under an equal pressure and at an equal rate of volume flow from two nozzles respectively disposed at the two sides of the workpiece W to move along the wire and impinge on each other at a mid region between the upper and lower surfaces of the workpiece in the cutting zone. The two opposing streams are thus deflected away from the traveling wire E, moving through the cutting slot S away from the cutting zone and eventually flowing out thereof into both of the upper and lower sides of the workpiece but mostly at the latter side due to gravity. This arrangement has been found to create, adjacent the electrode wire E and the cutting front Wf in the region of impingement, a "dead" zone or zone of cavitation or turbulence, in which renewal of the cutting liquid medium and hence cooling of the wire, removal of erosion products, and erosive current are insufficient, thus tending to bend the wire away from the cutting front. Since the erosion is less and slower there, the wire E will bend. In the arrangement illustrated, the lower injection stream is made higher in pressure and volume rate of flow than the upper injection stream. The region of impingement is shifted upwards and the upwardly moving stream injected from the lower nozzle 12 predominates over the downwardly moving stream injected from the upper nozzle 11 in the cutting zone and also in the cutting slot S. The downward stream injected under lower pressure alongside the wire E from the upper nozzle 11 into the cutting zone is deflected at an acute angle by, and drawn into, the higher volume flow upward stream injected under higher pressure from the lower nozzle 12 and moving alongside the wire into the cutting zone. The upwardly moving stream from the lower nozzle 12 moves alongside the wire, entraining therein a portion of the downwardly moving stream from the upper nozzle 11, and then moves upwards aslant at a high rate of volume flow, in major part to directly spout into the space above the workpiece W out of the cutting slot S and partly to flow up and down through the cutting slot out below the workpiece W due to gravity. In the absence of guide means 31, the high-rate upwardly moving flows are allowed to spout into the upper open space out of the cutting slot S freely across a substantial length thereof behind the upper nozzle opening 13 and, as shown at Fo, are further deflected rearwards by portions of the stream directly flowing out thereof radially above the workpiece W. Since the cutting liquid medium is thus allowed to spread over a substantial, uncontrolled width in the cutting slot S, a "dead" zone as mentioned remains unremoved in the cutting zone.

In the illustrated arrangement embodying the invention, the discus member 31 is provided to regulate the flushing liquid flows in the cutting slot S and hence in the cutting zone. The discus member 31 is disposed to overlie the workpiece W in a space surrounding the nozzle opening 13 of the upper nozzle assembly 11. The lower disk plate 33 with the annular opening 37 is closely juxtaposed in parallel with the upper surface of the workpiece W to provide an annular surface overlying and thereby substantially closing the cutting slot S in that space except a portion thereof immediately adjacent the nozzle opening 13 to impede the cutting liquid medium tending to freely flush out of the cutting slot and to guide it to controlledly flow out through that portion. Thus, the annular opening 37 provides an escape passage for the impeded or deflected cutting liquid medium adjacent the upper nozzle opening 13. Since the hollow discus member 31 provides a low pressure zone, all flows adjacent the nozzle opening 37 tend to pass through the annular opening 37. As a result, a high-velocity laminar stream of the cutting liquid medium F is established flowing from the nozzle opening of the high-pressure, lower nozzle assembly 12 to assure a sufficient renewal of the cutting liquid medium alongside the electrode wire E in the cutting zone and at the same time to back up the electrode wire against the rearward deflection while substantially eliminating a "dead" zone as previously described. The liquid medium led into the hollow discus member 31 is allowed to flow out through the openings 36 formed in the upper disk plate 32 and the openings 38 formed in the annular side element 34.

The nozzle members 15, 25 may each be adapted to provide nozzle openings of various sizes and shapes. Thus, the lower nozzle member 25 is shown as comprising a base 25d and a nozzle piece 25c detachably threaded therewith. The nozzle piece 25c may be one selected, according to a particular machining operation, from nozzle pieces of various configurations as shown in FIGS. 4A, 4B; 5A, 5B; 6A, 6B; 7A, 7B; and 8A, 8B. The nozzle piece 25c shown in FIGS. 4A and 4B is designed to provide a circular nozzle opening 25a of a relatively narrow width coaxially surrounding the electrode wire E. The nozzle pipe 25c shown in FIGS. 5A and 5B provides a circular nozzle size 25a of a larger nozzle opening to coaxially surround the wire E. The nozzle piece 25c shown in FIGS. 6A and 6B is formed with a nozzle opening 25a which is elliptical in section coaxially surrounding the electrode wire E. The nozzle piece 25c shown in FIGS. 7A and 7B has a nozzle opening 25a with a sectional shape comprising a semicircle coaxial with the electrode and a parabola connected with the semicircle. FIGS. 8A and 8B show another embodiment of the nozzle piece 25c which is triangular in section surrounding the electrode wire E. The upper nozzle member 15 may be similarly constructed.

Figure 9:
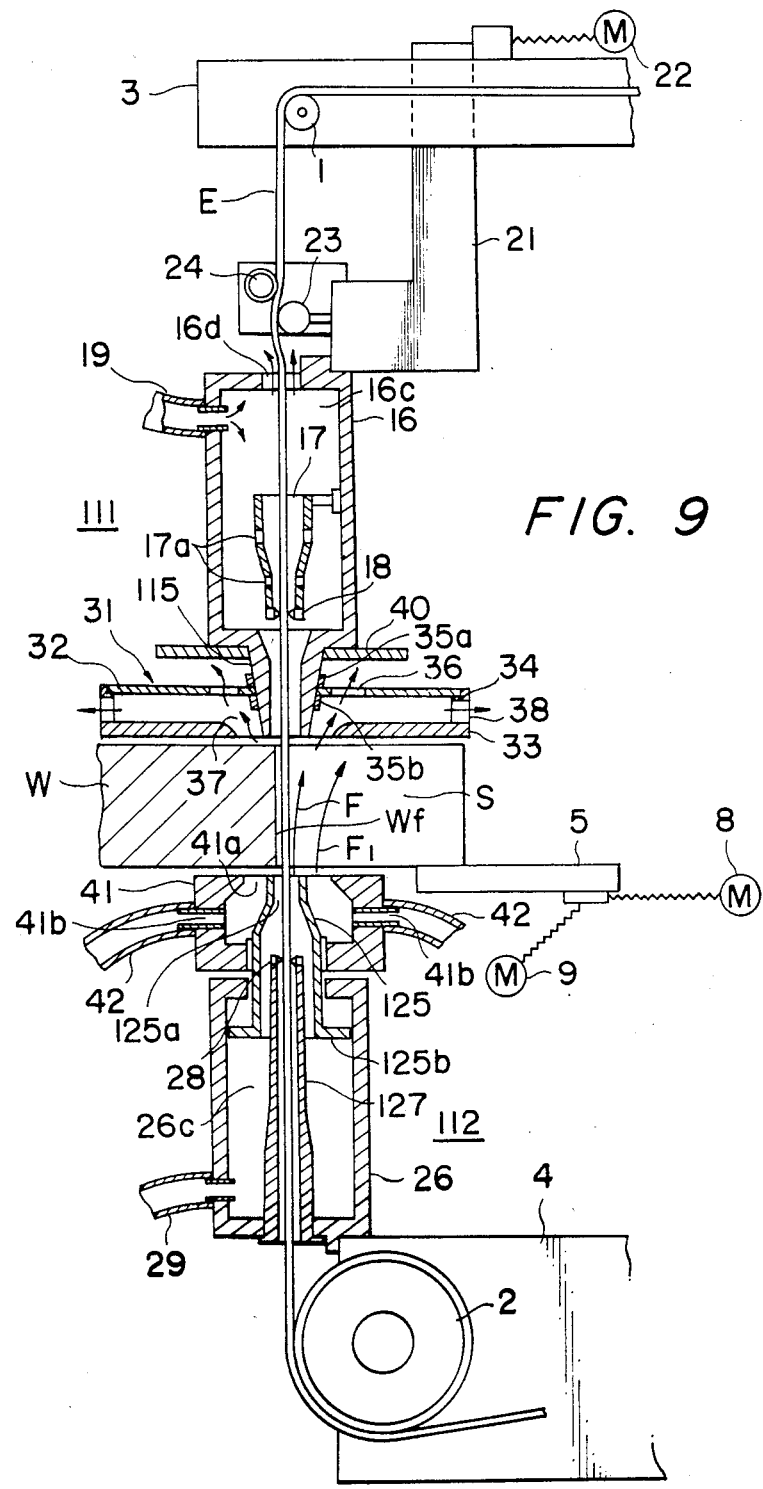
FIG. 9 is a diagrammatic elevational and partly sectional view illustrating a modification of the system of FIG. 1, also including an auxiliary nozzle which is annular and associated with the main nozzle member in the lower nozzle assembly.
Figure 10:
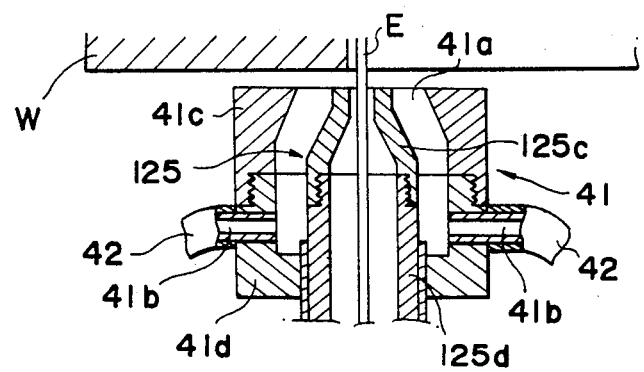
FIG. 10 is a diagrammatic longitudinal sectional view of a preferred embodiment of the lower nozzle assembly shown in FIG. 9.
Figure 11:
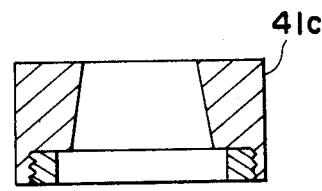
FIGS. 11 and 12 are longitudinal sectional views diagrammatically illustrating two examples of the auxiliary nozzle which may be used in the embodiment of FIG. 10.
Figure 12:
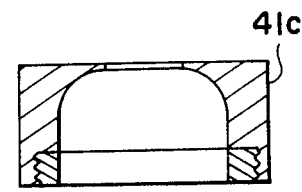

FIG. 9 shows a TW-EDM machine with a controlled fluid flushing system representing a modification of the system shown in FIG. 1 and uses like reference numerals to designate like components. In this embodiment, the upper nozzle assembly 111 has a nozzle member 115 which is integral with or securely fixed to the housing member 16. The nozzle member 115 has a forwardly tapered outer cylindrical wall and carries a fluid flow guidance assembly 31 as previously described. The upper nozzle assembly 111 is also provided with an annular disk 40 fitted onto the nozzle member 115 and designed to deflect the liquid medium upwardly flowing or splashing through the upper openings 36 of the flow guidance assembly 31. The lower nozzle assembly 112 has again a floating nozzle member 125, here forwardly tapered, and a tubular wire-guide supporting member 127 which here is inserted and extends from the lower outer end of the housing member 26, coaxially with the electrode wire E guided thereby. In addition, the lower nozzle assembly 112 is provided with an auxiliary nozzle 41 coaxially surrounding the main nozzle member 125. The auxiliary nozzle 41 has an annular nozzle opening 41a coaxial with the main nozzle opening 125a and is shown provided with a plurality of fluid inlets 41b connected via flexible hoses 42 with the source of cutting liquid medium to be described. As shown in FIG. 10, the main nozzle member 125 may again comprise a base 125d and a nozzle piece 125c detachably threaded therewith. The nozzle piece 125c may be one selected from a predetermined set of different nozzle pieces as shown and described in connection with FIGS. 4A, 4B 8A, 8B. The auxiliary nozzle 41 is also shown comprising a base 41d and a nozzle piece 41c detachably threaded therewith. A particular auxiliary nozzle piece 41c is selected according to or corresponding to a particular main nozzle piece 125c as suitable for a particular machining operation desired. Two examples of the auxiliary nozzle piece 41c are shown in FIGS. 11 and 12.

With the illustrated arrangement of the lower nozzle assembly 112, the main nozzle 125 is fed with the cutting liquid medium under an elevated pressure, say, of 10 to 20 kg/cm$^2$ to produce a high-velocity columnar stream coaxially surrounding the electrode wire E therein and to direct it into the cutting zone from the lower side. The nozzle 115 in the upper nozzle assembly 111 is then fed with the cutting liquid medium under a pressure, say, of 3 to 10 kg/cm² to produce a low flow-rate columnar stream coaxially surrounding the wire E therein and to direct it into the cutting zone from the upper side as previously described. The auxiliary nozzle 41 in the lower nozzle assembly 112 is fed with the cutting liquid medium under a relatively low pressure, say, of 5 to 10 kg/cm² to produce therein a low-velocity annular stream coaxially surrounding the main nozzle 125. The low-velocity stream from the auxiliary nozzle 41 is provided to form a protective curtain for the high-velocity columnar stream from the main nozzle 125 and a pressure cushion to force the latter substantially in its entirety to pass into the cutting zone, moving, without breakup or divergence, alongside the electrode wire E.

Figure 13:
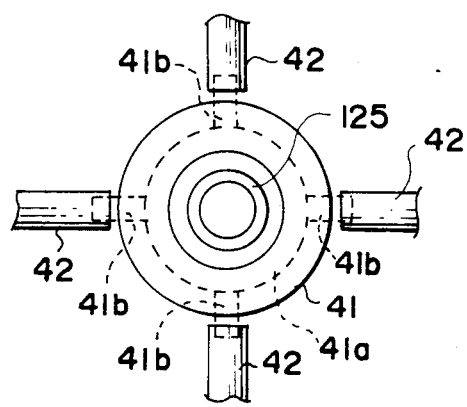
FIGS. 13 and 14 are transverse cross-sectional views diagrammatically illustrating embodiments of the compound nozzle assembly shown in FIG. 9.
Figure 14:
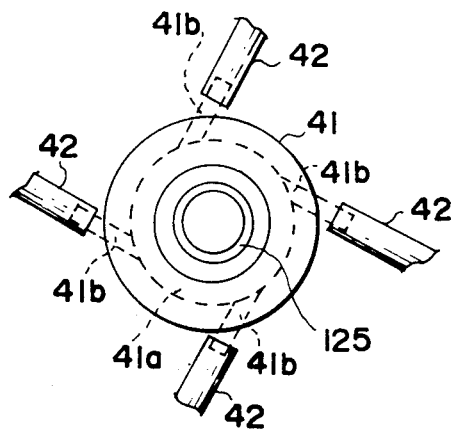

As shown in FIG. 13, the fluid inlets 41b into the auxiliary nozzle 41 may be oriented perpendicular to the cross section of the main nozzle 125. To intensify the high-velocity stream issuing from the main nozzle 125 coaxially with the electrode wire E, a modification of the auxiliary nozzle shown in FIG. 14 has four fluid inlets 41b oriented tangentially to such a circular cross-section to create in the chamber 41a a swirling flow of the low-pressure stream which is projected coaxially with the electrode wire 3 to provide an enhanced protective curtain and pressure cushion for the main, high-velocity cutting liquid stream.

Figure 15:
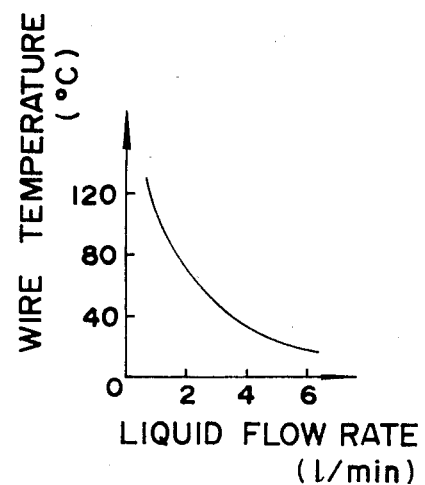
FIG. 15 is a graph illustrating how the flow rate by volume of a cutting liquid medium affects the temperature of the electrode wire in a TW-EDM system.
Figure 16:
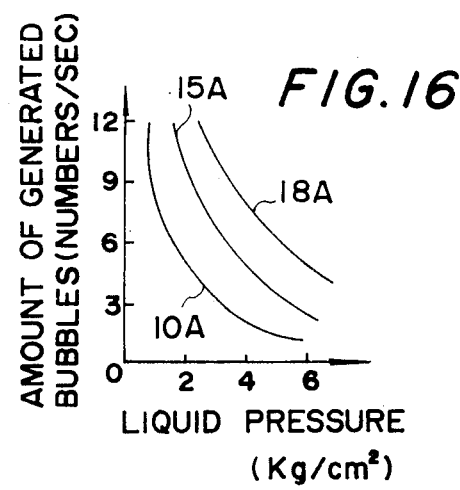
FIG. 16 is a graph illustrating how the pressure of a cutting liquid medium affects the amount of gas generated in the cutting zone.

The graph of FIG. 15 shows an empirically derived relationship between the temperature of a wire E and the flow rate of a cutting liquid medium in contact with the wire in the cutting zone for a given TW-EDM condition. It is seen that the wire temperature varies in inverse proportion to the cutting liquid flow rate, indicating that a higher flow rate is essential to avoid wire breakage due to thermal cause. The graph of FIG. 16 shows relationship between the amount of gaseous bubbles generated in the cutting zone and the pressure of a cutting liquid medium in the pressure chamber 26c in the lower nozzle assembly 12, 112, for three given TW-EDM operations using machining currents of 10A, 15A and 18A, respectively. For each operation, it is seen that the amount, shown by the number, of the gas bubbles generated varies in inverse proportion to the pressure applied to the cutting liquid medium. It is known that the lesser the amount of gas bubbles, the greater the cutting speed and the higher the cutting stability. It is therefore desirable that the cutting liquid medium be injected into the cutting zone at as a high pressure as practical. With a fluid flushing guidance assembly 31 arranged at the side of one nozzle assembly 11, 111, it has been found that best results are obtained when the liquid discharging pressure in the nozzle 25, 125 of the other nozzle assembly 12, 112 ranges from 1.5 to 5 times as great as the liquid discharging pressure in the nozzle 15, 115 of the first nozzle assembly 11, 111. The liquid discharging pressure in the auxiliary nozzle 41 may be as low as or somewhat greater than the liquid pressure in the one nozzle assembly 11, 111.

Figure 17:
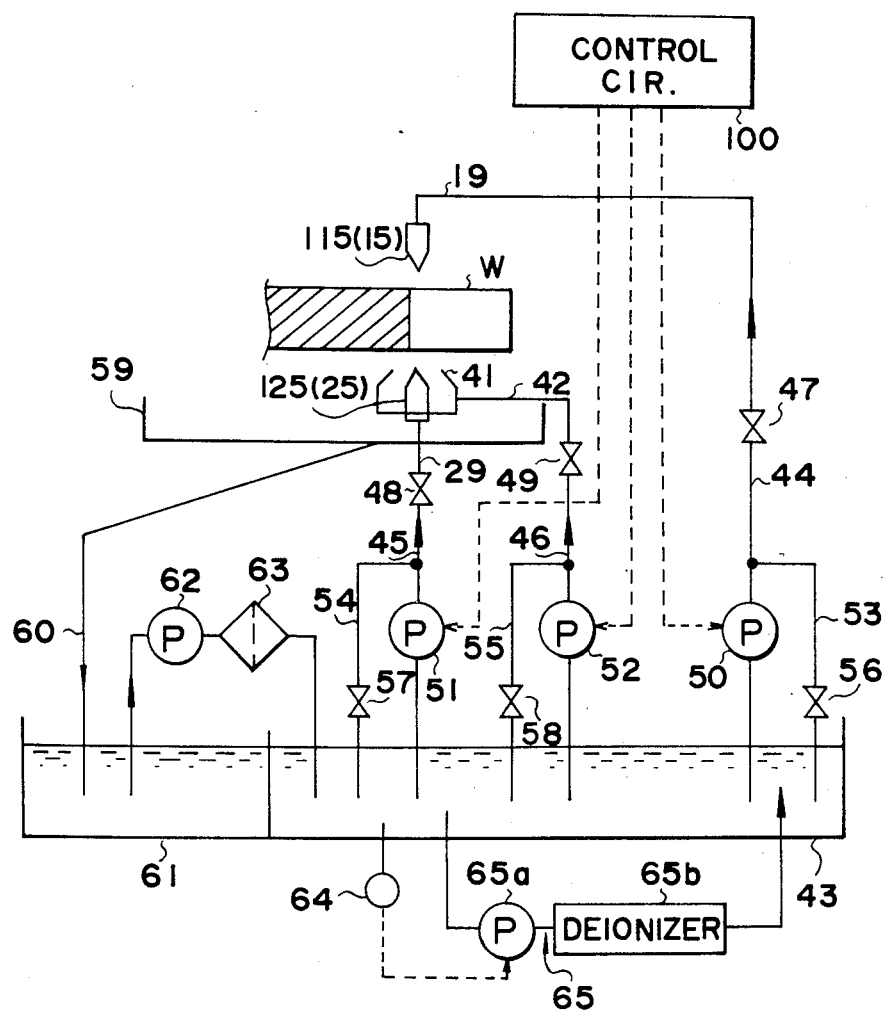
FIG. 17 is a diagrammatic view illustrating a fluid supply and circulation system which may be used with the system of FIG. 9.

FIG. 17 shows a fluid supply and circulation system which delivers deionized water as the cutting liquid medium in a common reservoir 43 through separate supply channels 44, 45 and 46 to the low-pressure nozzle 15, 115, the high-pressure nozzle 25, 125 and the auxiliary nozzle 41, respectively. Each of the channels 44, 45 and 46 is provided with a flow-rate adjusting valve 47, 48, 49 and a pump 50, 51, 52 with a return conduit 53, 54, 55 including a throttle valve 56, 57, 58. The pumps 50, 51 and 52 are shown as controlled by signals from a control circuit 100. The supplied water medium leaving the workpiece W and contaminated with machining products is collected in a working receptacle 59 carried on the worktable of the machine and the collected water is led via a drain conduit 60 into a sump 61. A further pump 62 draws the contaminated water in the sump 61 to pass it through a filter 63 and to return the water upon decontamination thereby to the reservoir 43 for recycling into the nozzles 15, 115; 25, 125; and 41 by the pumps 50, 51 and 52, respectively. The reservoir 43 may be provided with a sensor 64 for sensing the conductivity of the returned water therein, and a deionization circuit 65 comprising a pump 65a and a deionizer 65b in the form of an ion-exchange cartridge and operable in response to the sensor 64 for maintaining the conductivity of the water for recycling substantially constant.

Figure 18:
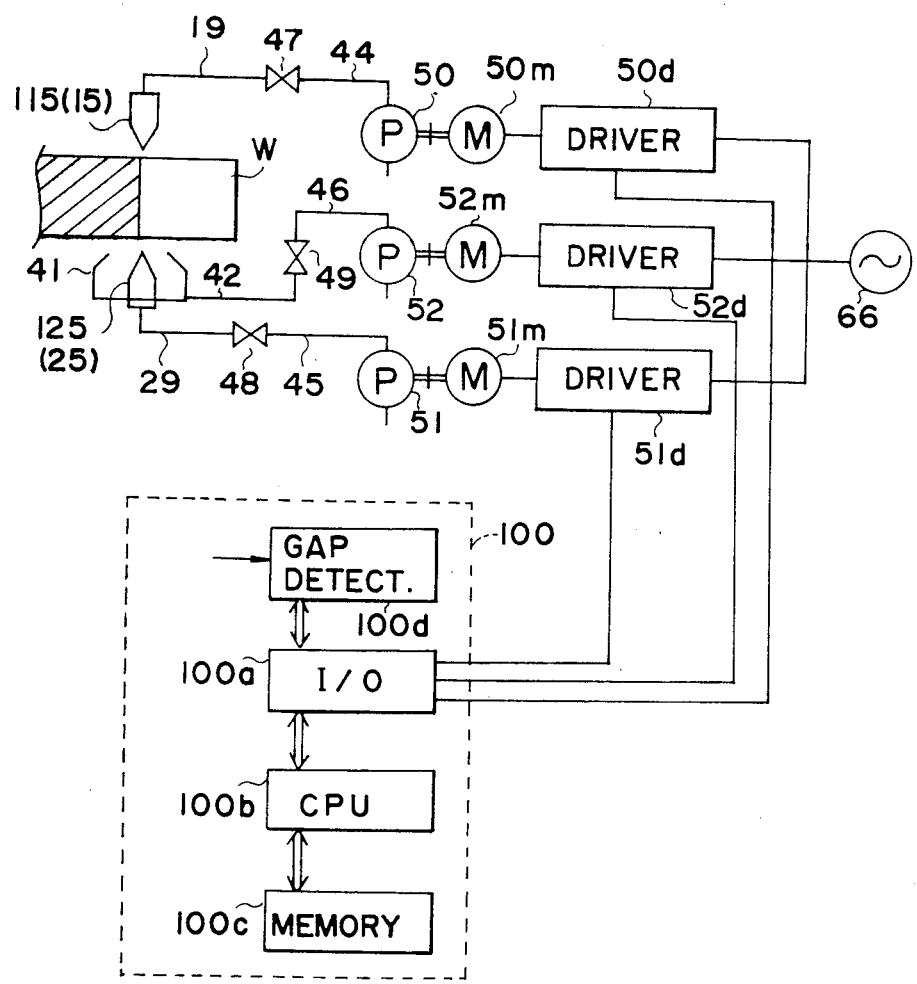
FIG. 18 is a diagrammatic view illustrating a system for controlling the pumping pressures and the rates of delivery of cutting liquid medium for supply into the workpiece in three flows produced in the system of FIG. 17.

As shown in FIG. 18, the pumps 50, 51 and 52 have their respective operating motors 50m, 51m and 52m which are energized by a common power supply 66. These motors are controllably driven by their respective driver circuits 50d, 51d and 52d in response to signals from the control circuit 100 to control the respective output pressures of the pumps 50, 51 and 52 and rates of delivery of the cutting liquid medium into the nozzles 15, 115; 25, 125; and 41 in a predetermined set of mode preprogrammed according to a particular cutting operation and also in accordance with changes in the erosive conditions in the cutting zone. The control circuit 100 includes an input/output interface 100a of a computer comprising a CPU (central processing unit) and a memory which has input data for these programmed modes stored therein. The control circuit 100 also includes a gap detector 100d which senses a short-circuit condition in the cutting zone and provides a detection output signal which is applied through the input/output interface 100a into CPU to enable the latter to select a particular multi-flushing mode from the programmed modes. Control signals are thus produced in CPU 100b and applied through the interface 100a to the driver circuit 50d, 51d and 52d.

Figure 20:
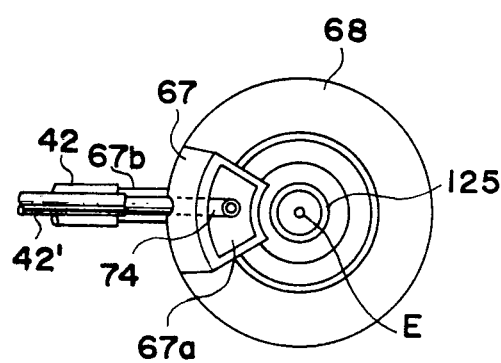
FIG. 20 is a plan view of the lower nozzle assembly, taken along the line XX—XX of FIG. 19 and as viewed from above.
Figure 19:
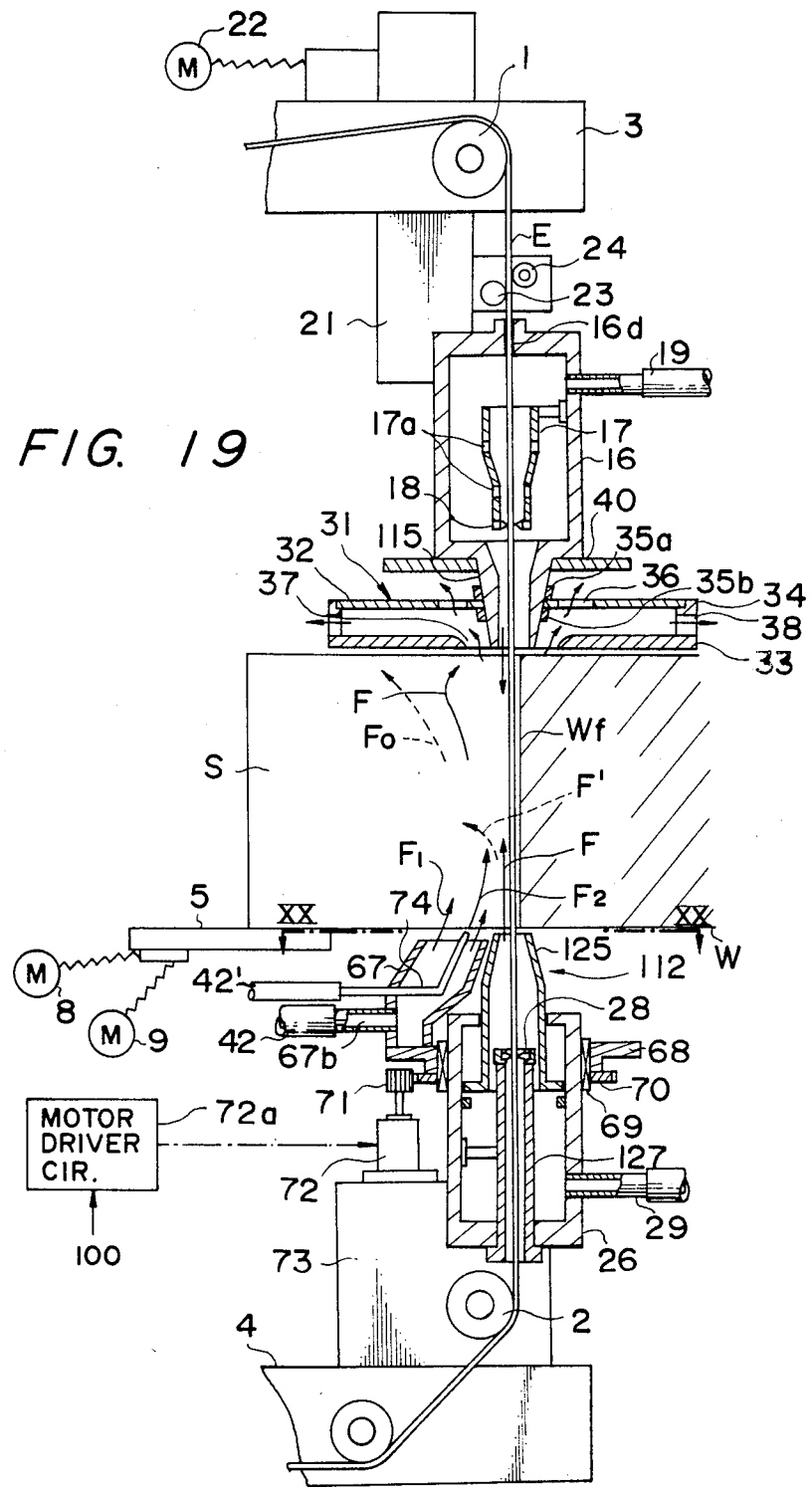
FIG. 19 is a diagrammatic elevational and partly sectional view of a modification of the TW-EDM system of FIG. 9, including a further auxiliary nozzle for controlling the flushing of the cutting zone with the main streams of cutting liquid medium.

FIG. 19 shows a modification of the system of FIG. 9 and uses like reference numerals to designate like parts. In this modified embodiment, an auxiliary flushing nozzle designated at 67 is arranged adjacent the main nozzle 125 in a side by side relationship therewith so as to be oriented upwards aslant with respect to the electrode wire E. The auxiliary nozzle 67 has a fan-shaped nozzle opening 67a as shown in FIG. 20 and is provided with a fluid inlet 67b with which a flexible fluid supply hose 42 is fitted. The nozzle 67 is securely supported on a rotary carriage 68 which is annular and journaled coaxially on the cylindrical housing 26 by means of a bearing 69. The carriage 68 has a gear ring 70 attached thereto which is in mesh with a gear 71 secured on the output shaft of a motor 72. The housing member 26, the lower wire-guide and -conducting roll 2 and the motor 72 are here mounted on a block 73 which is carried on the lower arm 4 of the machine. Disposed in the auxiliary nozzle 67 is a further auxiliary nozzle 74 having a narrow nozzle opening and fed with the liquid medium via a flexible hose 42' from the liquid source. The auxiliary nozzle 74 passes through the auxiliary nozzle 67 and is secured thereto so that two nozzles are movable together about the axis of the main nozzle 125 and hence about the electrode wire E. The carriage 68 is rotated by the motor 72 to locate the auxiliary nozzles 67 and 74 behind the electrode wire E. The auxiliary nozzle 74 produces a thin, intensive stream F2 of liquid medium and directs it towards the electrode wire E in the workpiece W to hold therewith the main stream F of liquid medium from the primary nozzle 125 against deflecting and diverging into a direction F' away from the wire due to gravity. The auxiliary nozzle 67 produces a subsidiary flow F1 of liquid medium, which serves as a protective curtain and a pressure cushion, to prevent the main stream F and the auxiliary stream F2 from aerating in the cutting slot zone and slot S. During the course of a cutting operation, the motor 72 is operated to control the angular position of the nozzle 67 in a fixed angular coordinate system so as to maintain the auxiliary flushing flow F2 and the subsidiary flow F1 always oriented behind the electrode wire inspite of changes in the course of advance of the wire E along a prescribed cutting path.

Figure 21:
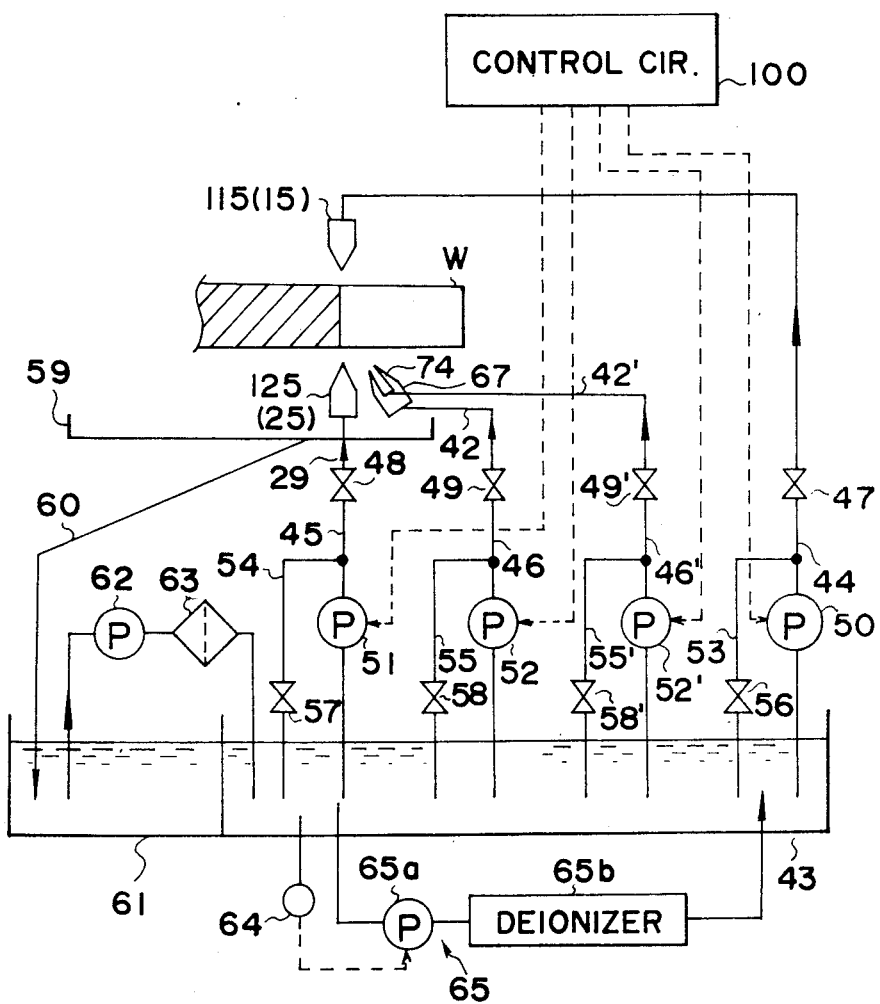
FIG. 21 is a view similar to that of FIG. 17, diagrammatically illustrating a fluid supply and circulation system which may be used with the system of FIG. 19.

FIG. 21 shows a fluid supply and circulation system which is similar to that shown in FIG. 17 and includes an additional fluid delivery channel 46' for supplying the cutting liquid medium to the auxiliary nozzle 74 via the conduit 42' from the common reservoir 43. The channel 46' includes a valve 49' and a pump 52' with a return conduit 55' including a valve 58'. Here again, the pumps 50, 51, 52 and 52' are controllable in response to output signals of the control circuit 100 described previously.

Figure 22:
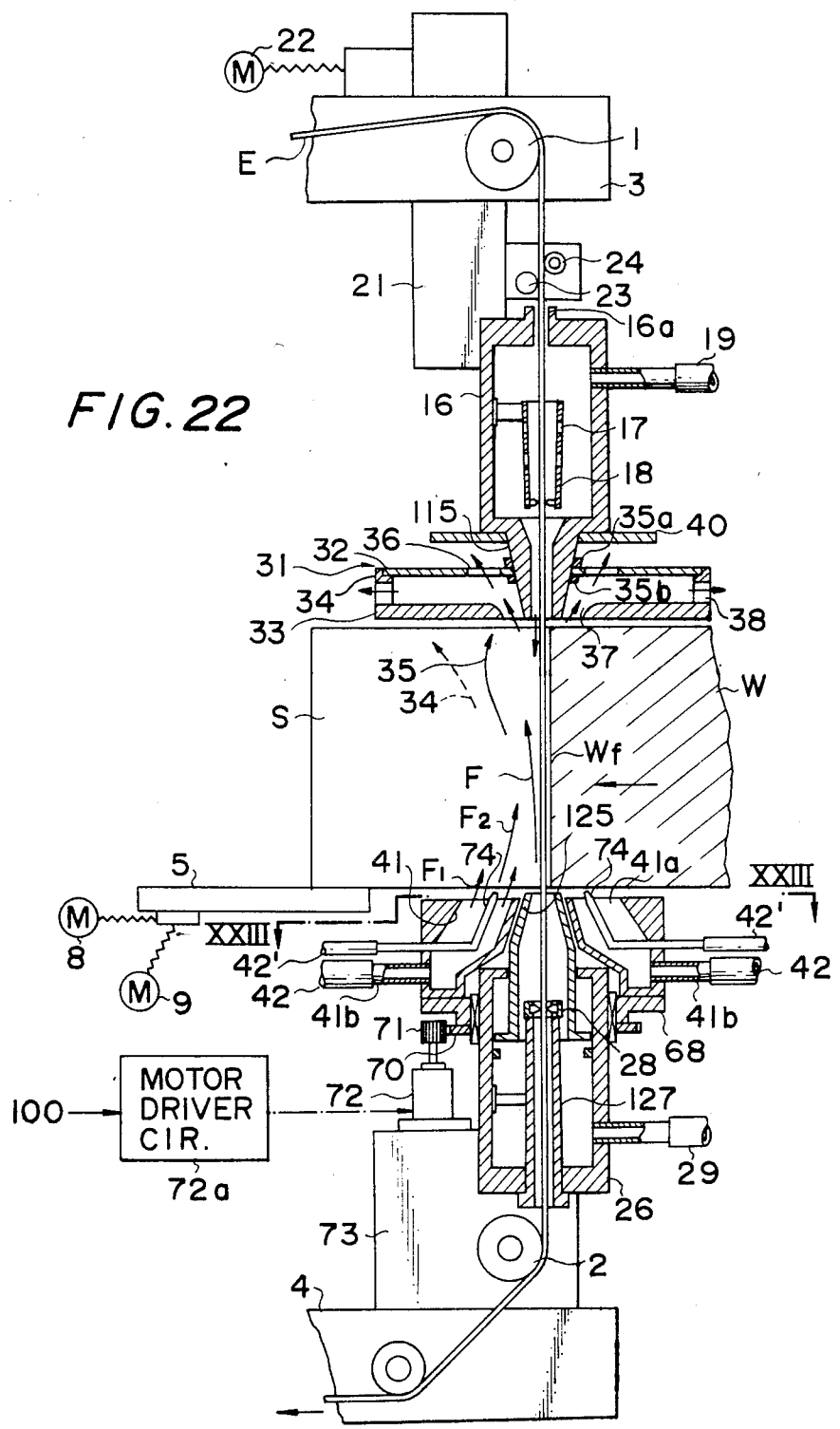
FIG. 22 is a diagrammatic elevational and partly sectional view of a modification of the system of FIG. 19.
Figure 23:
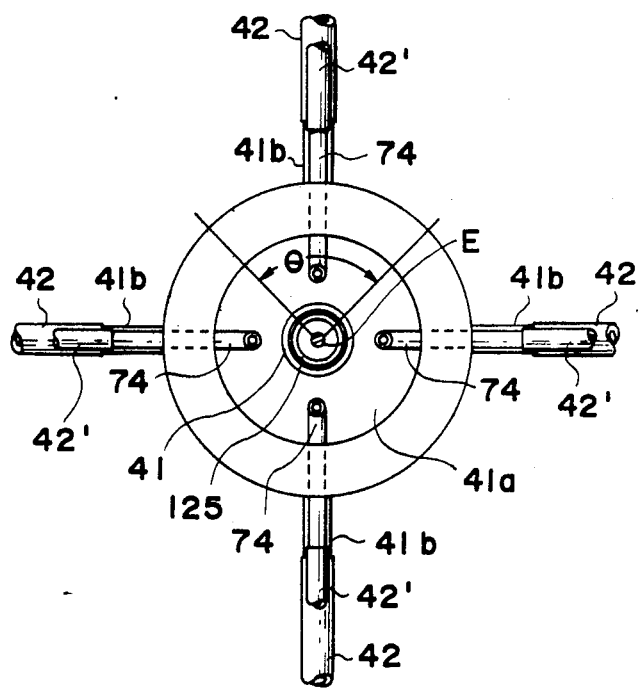
FIG. 23 is a plan view of the lower nozzle assembly, taken along the line XXIII—XXIII of FIG. 22 and seen from above.
Figure 24:
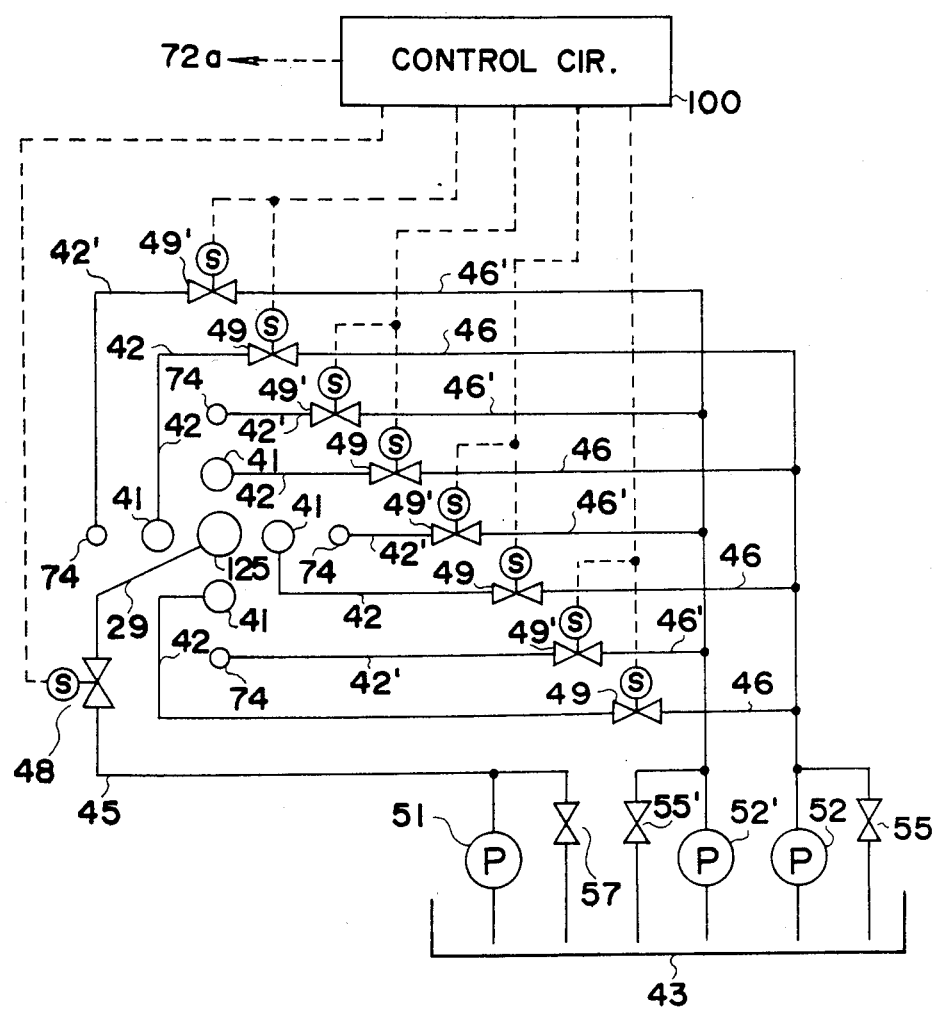
FIG. 24 is a diagrammatic view illustrating a fluid supply and circulation system which may be used with the system of FIG. 22.

In a modification of the arrangement of FIG. 19, the auxiliary nozzle 67 may be of annular form as shown at 41 in FIG. 9 and one or more further auxiliary nozzles 74 may be introduced therein. Such a modification is shown in FIG. 22, using a plurality of narrow auxiliary nozzles 74 disposed, surrounding the main nozzle 125, in the annular nozzle which is designated at 41 as carried on the rotary carriage 68. The thin auxiliary nozzles 74, positioned equi-distantly spaced about the main nozzle 125, may, as shown in FIG. 23, be four in number and provided with four fluid inlets connected with four fluid supply hoses 42', respectively when the annular auxiliary nozzle 41 is provided with four fluid inlets 41b connected with four supply hoses 42 respectively. As shown in FIG. 24, the inlet hose 29 for the main nozzle 125 is connected with the supply conduit 45 and supplied with the cutting liquid medium from the reservoir 43 by means of the pump 51. The four inlet hoses 42 for the annular nozzle 41 are connected with the reservoir 43 via four supply conduits 46, respectively, and supplied with the liquid medium by the common pump 52. The respective inlet hoses 42' for the four narrow auxiliary nozzles 74 are connected with the reservoir 43 via four supply conduits 46', respectively, and supplied with the liquid medium by the common pump 52'. In the arrangement shown in FIG. 24, the valve 48 in the main conduit 45, the valves 49 in the first set of auxiliary conduits 46 and the valves 49 in the second set of auxiliary conduits 46' are all of electromagnetic type and adapted to be controlled under command of the control circuit 100. In this manner, it is possible to reduce the range of angles θ of rotation of the rotary carriage 68 by the motor 72 to $2\pi/4$ equal to 90° in order to maintain a thin, intensive assisting stream of the liquid medium always oriented behind the electrode wire E inspite of a change in the course of advance thereof along the predetermined cutting path. In this case, during the cutting operation, the valve 48 in the main conduit 45 and all the valves 49 in the first set of auxiliary conduits 46 may remain open and at any one time only one of the four valves 49' in the second set of auxiliary conduits 46' is opened to supply one narrow auxiliary nozzle 74 with the liquid medium while the others of these four remain closed and the motor driver circuit 72a is operable to act on the motor 72 to adjust the angular position of that narrow auxiliary nozzle 74, all under the commands of the control circuit 100. At the same time, of course, the degrees of opening of the opened valves may be controlled under the commands of the control circuit 100 to regulate the pressures and the rates of delivery of the liquid medium through the respective nozzles in accordance with the conditions in the cutting zone as previously described.

FIGS. 25 and 26 show another form of the flow guidance means according to the invention. A flow guidance member 131 shown comprises a cylindrical base part 131a and an annular disk part 131b which radially extends from an end portion thereof. The cylindrical part 131a is fitted onto an end portion of an upper nozzle member 15 as previously described, and fastened thereto by means of a ring fastener 135a and bolt 135b' as shown. The annular disk 131b is formed with a plurality of apertures 137 adjacent and surrounding the end portion of cylindrical base part 135a to constitute escape openings for a high-velocity stream F of the high-pressure cutting liquid medium from the lower nozzle 25 as described previously. Conveniently, the flow guidance member 131 is composed of a plastic or rubber material and is flexible. Here, the member 131 is preferably arranged to hold the disk part 131b in sliding contact with the upper surface of the workpiece W. To facilitate this, the disk part 131b is preferably designed to be magnetically attractable to the workpiece W when composed of a magnetic material such as a magnetic steel. To this end, as shown in FIG. 27, a multiplicity of magnets 139, each in the form of a disk, plate, cylindrical column, rectangular solid or particle, may be embedded in the disk plate 131b. By so arranging and constructing the member 131, the disk 131b not only overlies but also completely shields the cutting slot S from above, except for a portion thereof directly beneath an escape opening 137, behind the upper nozzle opening 13 with respect to the direction of advance of the electrode wire E so that the high-velocity flushing stream flowing from the cutting slot S into, through and out of that escape opening is highly intensified. In addition, the flow-guidance disk plate 131b when magnetically attracted to the workpiece W serves advantageously to retain together two parts thereof divided by the cutting slot S. One such severed part of the workpiece W is always supported by the worktable 5 but the other severed part becomes non-supported and tends to fall off the one part or cant due to gravity. Since here the disk 131b bridges and is magnetically attracted to, the two parts, the one non-supported part is effectively prevented from falling off or canting.

Figure 28:
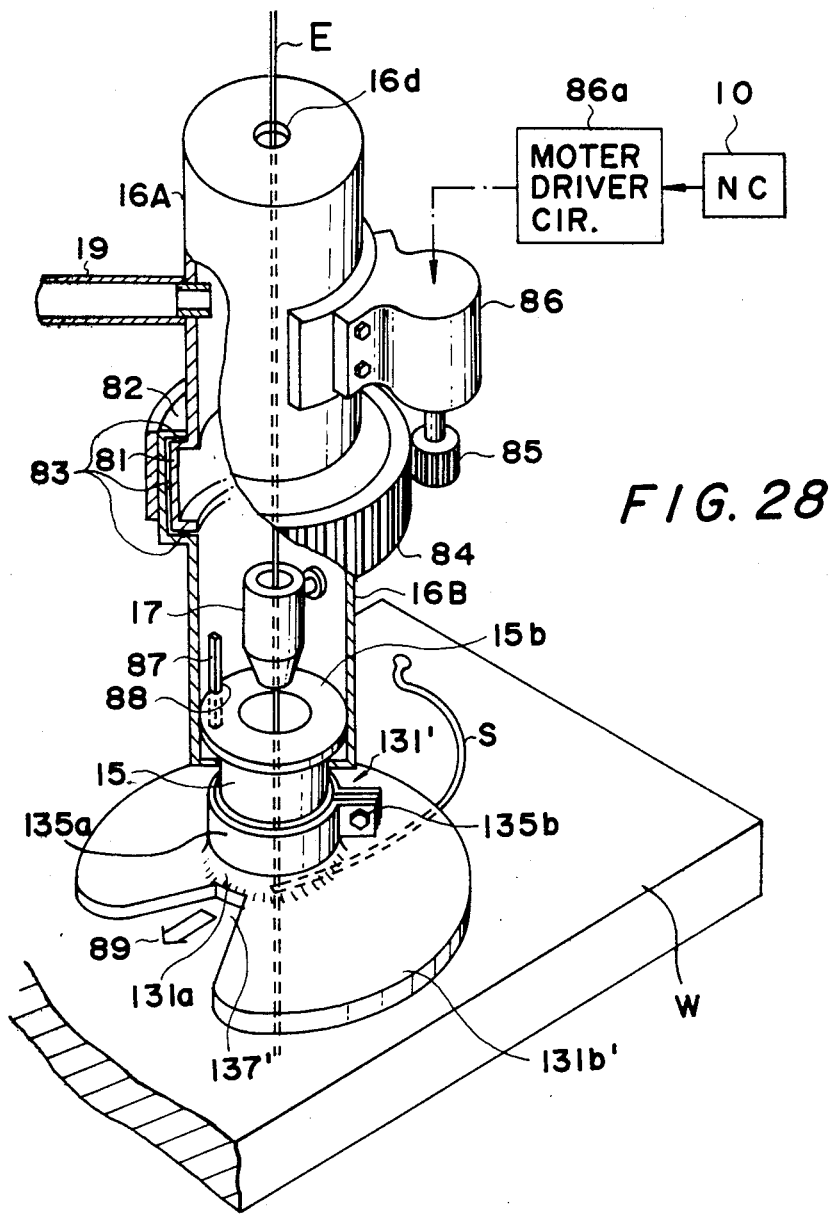
FIG. 28 is a perspective view diagrammatically illustrating a further embodiment of the flow guidance system according to the present invention.
Figure 29:
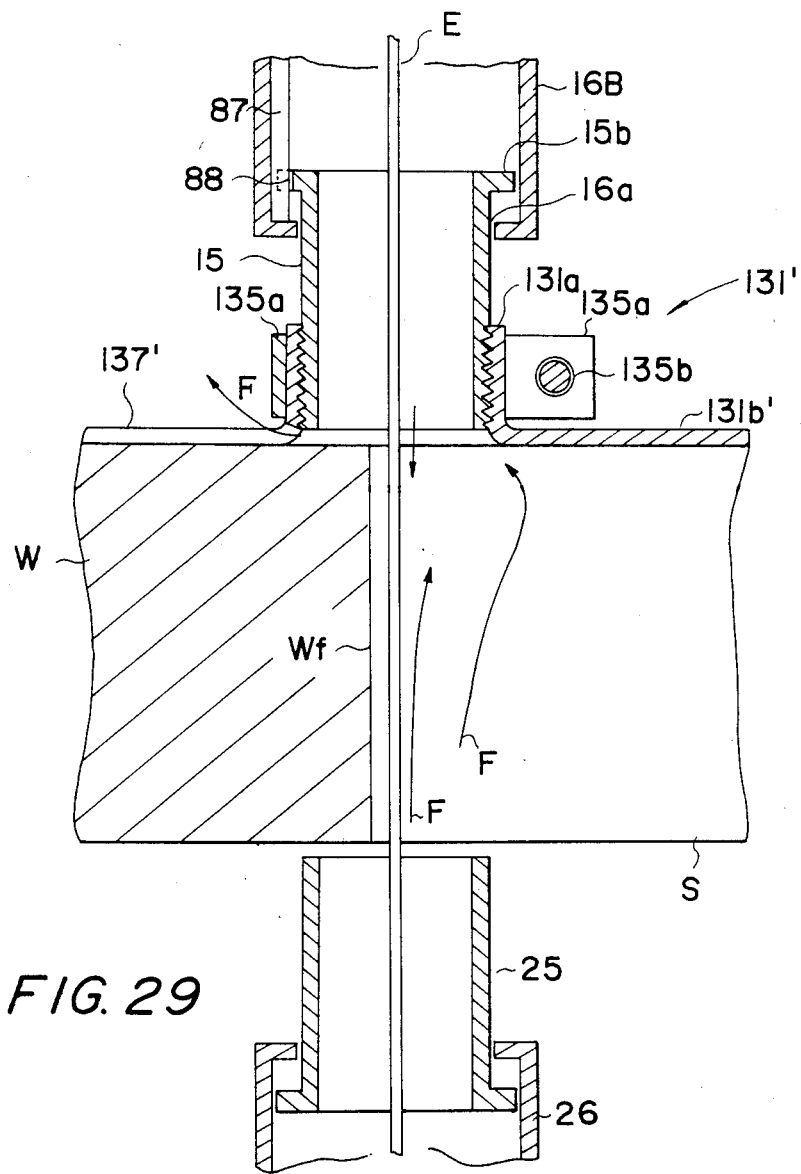
FIG. 29 is a diagrammatic elevational view in section of an essential portion of the system of FIG. 28.

FIGS. 28 and 29 show a modification 131' of the flow guidance member shown in FIGS. 25 and 26. In this modification, the disk portion designated at 131b' has a notched portion 137', instead of a plurality of apertures 137, to provide a fluid escape opening or passage as required in accordance with the invention. Furthermore, the cylindrical housing 16 is divided into an upper housing member 16A having the fluid inlet conduit 19 and a lower housing member 16B from which the nozzle member 15 slidably projects. The upper housing member 16A is fixed to the vertical carriage 21 (FIG. 1)

and the lower housing member 16B is rotatably coupled with the upper housing member 16A. Thus, the upper cylindrical housing member 16A has at its lower end a radially projecting coupling portion 81 and the lower cylindrical housing member 16B has its upper end a radially projecting coupling portion 82 which surrounds the coupling portion 81 and is mechanically coupled therewith by means of bearings 83. The coupling portion 82 secured to the lower housing member 16B has a geared periphery 84 which is in mesh with a gear 85 secured to the output shaft of a motor 86 which is secured to the upper housing member 16A. The inner wall of the lower cylindrical housing member 16B is formed with a longitudinally extending projection 87 which is keyed in a slot 88 formed in the flange portion 15b of the nozzle member 15 to assure that when the lower cylindrical housing member 16B is rotated about the wire E by the motor 86, the nozzle member 15 and the flow guidance member 131' are rotated integrally therewith about the wire E. In the illustrated arrangement, it is necessary that the notch 137' formed in the flow deflecting disk 131b'to constitute the fluid escape passage mentioned is always located in the direction of cutting 89 which varies while the wire E is advanced along a prescribed path in the workpiece W, leaving the cutting slot S behind therein. The motor 86 is driven by a driver circuit 86a in response to signals from the NC unit 10 to maintain the notch or fluid escape passage 89 always located in spite of a change in the course of advance of the wire E along the prescribed cutting path. Here again, the cutting liquid medium in the cutting slot S is effectively deflected and guided to pass through the passage 137' to produce a high-velocity, intense stream F of the liquid medium flowing therethrough from the lower nozzle member.

What is claimed is:

1. In an apparatus for electroerosively cutting an electrically conductive workpiece with a continuous wire electrode, having means for axially transporting the wire electrode through the workpiece while defining a cutting zone therewith flushed with a cutting liquid medium, power supply means for electrically energizing said cutting zone to erode the workpiece, and cutting feed means for relatively displacing the workpiece and the traveling wire electrode transversely along a cutting path to progressively form a cutting slot behind the wire electrode advancing along the path in the workpiece, the improvement which comprises:

first nozzle means disposed at one side of the workpiece and having a nozzle opening juxtaposed with the cutting zone and substantially coaxially surrounding the wire electrode for directing the cutting liquid medium under a first pressure into the cutting zone from said one side;

second nozzle means disposed at the other side of the workpiece and having a nozzle opening juxtaposed with the cutting zone and substantially coaxially surrounding the wire electrode for directing the cutting liquid medium under a second pressure higher than the first pressure into the cutting zone from said other side; and liquid flow guidance means disposed at said one side and adjacent to said workpiece and to the nozzle opening of said first nozzle means, said flow guidance means having a liquid escape passage formed therein adjacent said nozzle opening and a flow deflecting surface overlying said cutting slot along a length thereof for impeding the flushing liquid medium in the cutting slot to flush out directly into said one side along said length and creating a high-velocity stream of the high-pressure cutting liquid medium from said second nozzle means flowing through and out of said liquid escape passage.

2. The improvement defined in claim 1 wherein said liquid escape passage is annular and formed in said guidance means so as to surround the nozzle opening of said first nozzle means substantially coaxially therewith.

3. The improvement defined in claim 1 wherein said liquid escape passage is constituted by a plurality of openings formed in said guidance means to surround the nozzle opening of said first nozzle means.

4. The improvement defined in claim 1 wherein said liquid escape passage is formed in said guidance means and arranged in position in front of the nozzle opening of said first nozzle means in the direction of advance of the wire electrode along said cutting path.

5. The improvement defined in claim 1 wherein said guidance means is a plate generally in the form of an annular disk surrounding the nozzle opening of said first nozzle means.

6. The improvement defined in claim 5 wherein said disk plate has an annular opening formed therein surrounding the nozzle opening of said first nozzle means and constituting said liquid escape passage.

7. The improvement defined in claim 5 wherein said disk plate has a plurality of openings formed therein surrounding the nozzle opening of said nozzle means and constituting said liquid escape passage.

8. The improvement defined in claim 5 wherein said disk plate has a notch formed therein and arranged to locate in front of the nozzle opening of said first nozzle means and thereby to constitute said liquid escape passage.

9. The improvement defined in claim 5 wherein said plate is arranged in parallel with the adjacent surface of the workpiece with a small spacing therefrom.

10. The improvement defined in claim 9 wherein said plate is arranged substantially flush with the nozzle opening of said first nozzle means.

11. The improvement defined in claim 5 wherein said plate is arranged in sliding contact with the adjacent surface of the workpiece.

12. The improvement defined in claim 11 wherein said plate is composed of a non-magnetic material having permanent magnets embedded therein to render said plate magnetically attractable to the workpiece when composed of a magnetic material.

13. The improvement defined in claim 12 wherein said nonmagnetic material is a plastic or rubber material.

14. The improvement defined in claim 5 wherein said disk plate is secured to said first nozzle means.

15. The improvement defined in claim 14, further comprising a further plate for deflecting a flow of the liquid medium passed through said escape passage.

16. The improvement defined in claim 1 wherein said guidance means and is securely held by said first nozzle means, further comprising cover means for deflecting a flow of the liquid medium passed through said escape passage.

17. The improvement defined in claim 1 wherein said guidance means comprises a hollow discus member securely supported by said first nozzle means, said discus member comprising a first plate generally in the form of a disk adjacent said workpiece and a second plate generally in the form of a disk substantially parallel to said first plate and remote from said workpiece, and a side member for connecting said first and second plates together, said first plate having an annular opening surrounding the nozzle opening of said first nozzle means and constituting at least a portion of said liquid escape passage.

18. The improvement defined in claim 17 wherein said second plate has a plurality of openings surrounding said first nozzle means for guiding the flow of the liquid medium passed into said hollow discus member through said annular opening to pass out of said discus member.

19. The improvement defined in claim 17 wherein said side member has a plurality of openings surrounding said first nozzle means for guiding the flow of the liquid medium passed into said hollow discus member through said annular opening to pass out of said discus member.

20. The improvement defined in claim 1 wherein said pressure of the liquid medium in said second nozzle means is at least 1.5 times as great as said pressure of the liquid medium in said first nozzle means.

21. The improvement defined in claim 20 wherein said first pressure ranges between 1 and 10 kg/cm$^2$ and said second pressure ranges between 5 and 20 kg/cm$^2$.

22. The improvement defined in claim 20 wherein said first and second nozzle means are disposed vertically above and below said workpiece, respectively.

23. The improvement defined in claim 22 wherein said electrode wire is transported downwards substantially vertically through said workpiece.

24. The improvement defined in claim 20 wherein at least one of said first and second nozzle means has a nozzle member comprising a base portion and a nozzle piece portion detachably threaded therewith.

25. The improvement defined in claim 20, further comprising an auxiliary nozzle means having a nozzle opening substantially coaxially surrounding the nozzle opening of said second nozzle means for producing a low-velocity stream which acts to prevent said high-velocity stream from diverging and entrapping air upon leaving the nozzle opening.

26. The improvement defined in claim 25, further comprising at least one subsidiary nozzle having a narrow nozzle opening disposed in said auxiliary nozzle means adjacent the nozzle opening of said second nozzle means for producing a thin, intensive assistant stream of the liquid medium which acts to back up said high-velocity stream from said first nozzle means and to prevent it from deflecting while moving alongside said wire electrode.

27. The improvement defined in claim 26 wherein said first and second nozzle means are disposed vertically above and below said workpiece, respectively and said wire electrode is transported downwards through said workpiece.

28. The improvement defined in claim 20, further comprising at least one subsidiary nozzle having a narrow nozzle opening disposed adjacent the nozzle opening of said second nozzle means, which is disposed below said workpiece, for producing a thin, intensive assistant stream of the liquid medium which acts to back up said high-velocity stream from said first nozzle means and to prevent it from deflecting due to gravity while moving alongside said wire electrode.

29. The improvement defined in claim 28, further comprising at least one auxiliary nozzle means disposed to surround said at least one subsidiary nozzle for providing an enveloping flow for said thin, intensive assistant flow therefrom.

30. The improvement defined in claim 26 or claim 29 wherein said at least one subsidiary nozzle is fixed with said at least one auxiliary nozzle means, further comprising a rotary carriage means for supporting said auxiliary nozzle means and drive means for rotating said carriage means to angularly position said subsidiary nozzle about the nozzle opening of said second nozzle means with respect to a predetermined reference angular position.

* * * * *